T. W. ROSE.
VALVE GEAR.
APPLICATION FILED AUG. 14, 1917.
1,418,473.
Patented June 6, 1922.
4 SHEETS—SHEET 1.
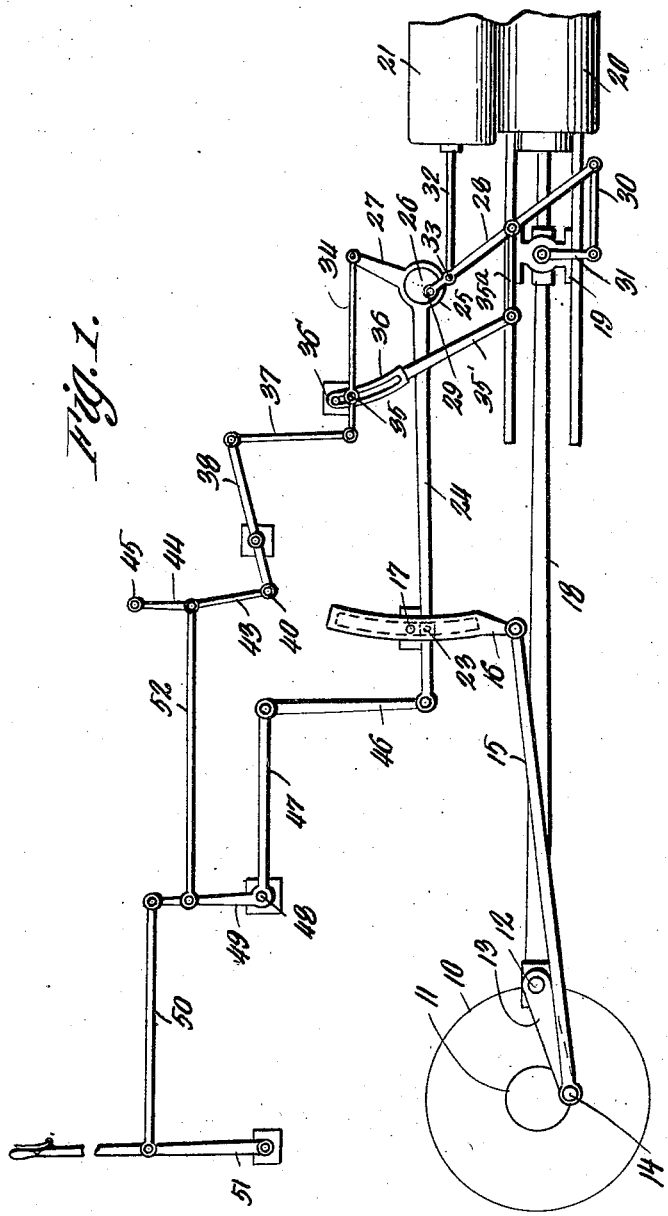
THOMAS W. ROSE INVENTOR.
BY
*Richard B. Owen*
ATTORNEY.

T. W. ROSE.
VALVE GEAR.
APPLICATION FILED AUG. 14, 1917.
1,418,473.
Patented June 6, 1922.
4 SHEETS—SHEET 2.
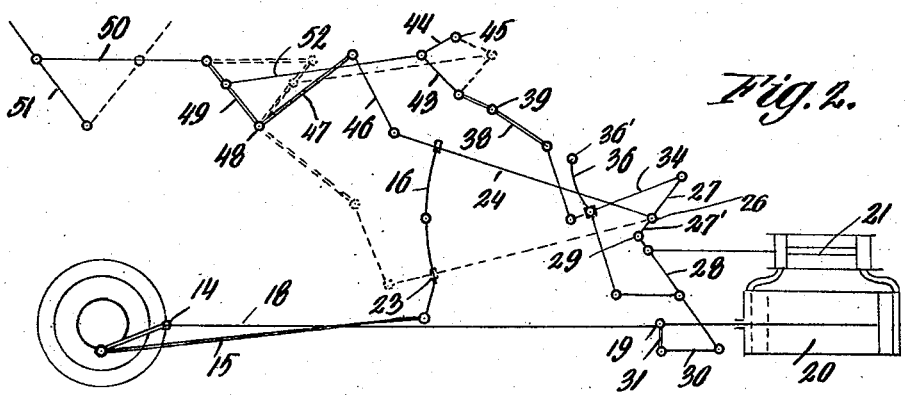
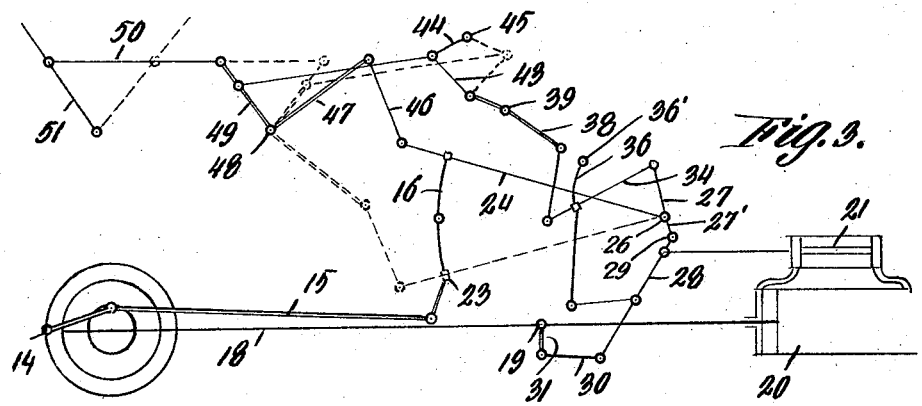
THOMAS W. ROSE, Inventor

T. W. ROSE.
VALVE GEAR.
APPLICATION FILED AUG. 14, 1917.

1,418,473.

Patented June 6, 1922.
4 SHEETS—SHEET 3.

Inventor
THOMAS W. ROSE

Attorney

T. W. ROSE.
VALVE GEAR.
APPLICATION FILED AUG. 14, 1917.
1,418,473.
Patented June 6, 1922.
4 SHEETS—SHEET 4.
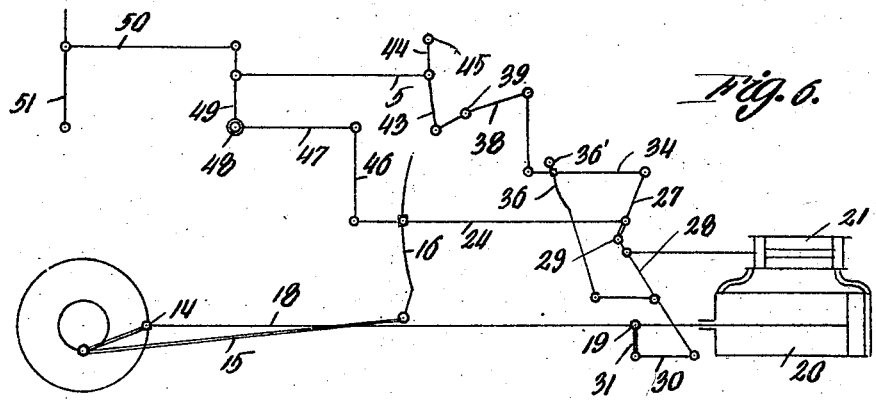
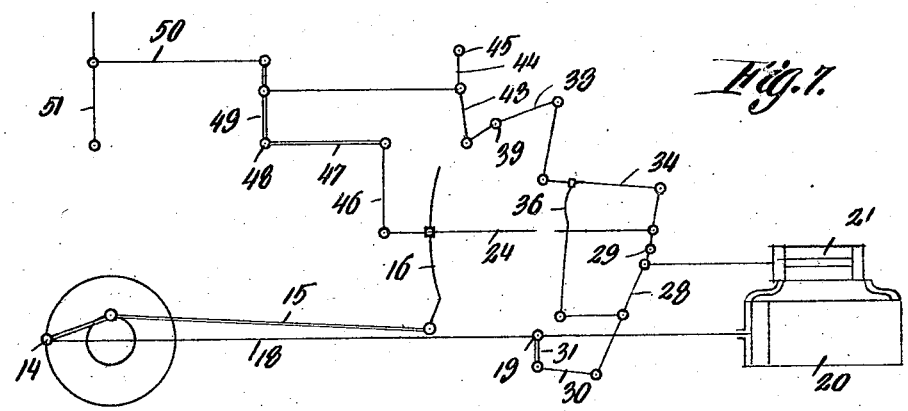
Inventor
THOMAS W. ROSE
Richard B. Owen
Attorney

UNITED STATES PATENT OFFICE.

THOMAS W. ROSE, OF SAVANNAH, GEORGIA.

VALVE GEAR.

1,418,473.  Specification of Letters Patent.  Patented June 6, 1922.

Application filed August 14, 1917. Serial No. 186,152.

*To all whom it may concern:*

Be it known that I, THOMAS W. ROSE, a citizen of the United States, residing at Savannah, in the county of Chatham and State of Georgia, have invented certain new and useful Improvements in Valve Gears, of which the following is a specification.

This invention has relation to valve gears for locomotives and has for an object to improve the Walschaert gear and gears of this type having an invariable lead, by providing an attachment thereto for the purpose of permitting variation of the lead of the valve or to vary the admission of steam to the cylinder relative to the position of the reverse lever of the locomotive.

In addition to the foregoing my invention comprehends improvements in the details of construction and arrangement of the parts to be hereinafter more fully described and to be particularly set forth in the appended claims.

In the accompanying drawings:—

Figure 1 is a side elevation of a valve gear constructed in accordance with this invention, the gear being removed from the engine and the steam chest, cylinder and certain other parts connected therewith being shown, the view also indicating the crank and eccentric circles.

Figure 2 is a diagrammatic view showing the crank pin on forward dead center, the position of the parts for forward notch of the engine being shown in full lines and for the backward notch of the engine in dotted lines, the valve having outside admission.

Figure 3 is a view similar to Figure 2 but with the crank pin on rearward dead center.

Figure 6 is a view similar to Figure 2 with the crank pin at the forward portion of the stroke and the reversing gear in mid position.

Figure 7 is a view similar to Figure 6 with the crank pin on the rear dead center.

Figure 4:
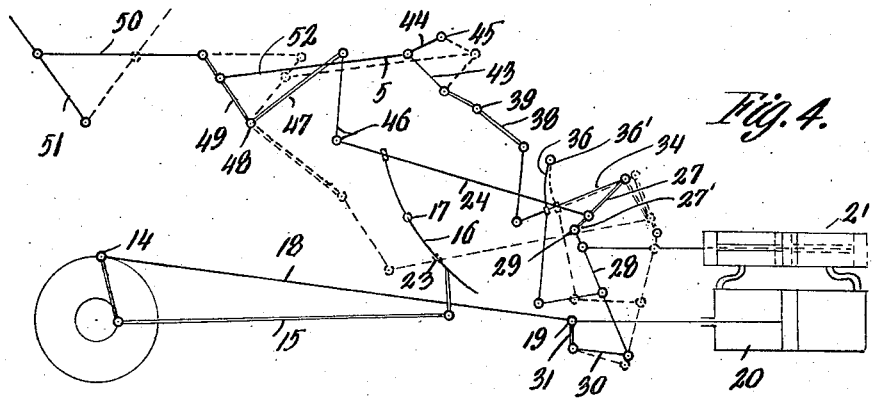
Figure 4 is a view similar to Figure 2 but with the crank pin substantially in its uppermost position.

The numeral 10 designates the crank circle of one of the drivers and the numeral 11 the eccentric circle thereof.

I have illustrated my invention as associated with the Walschaert type of gear in which the driver is provided with a crank pin 12 eccentrically mounted and to which an arm 13 is rigidly connected, said arm being spaced from the side of the driver and its outer end disposed eccentrically relative to the center of driver axle. The outer end of the arm carries a pin 14 to which the rear end of the eccentric rod 15 is connected, the other end of the eccentric rod being connected to an arcuate box link 16 pivotally mounted for oscillation at 17 upon a fixed point, the eccentric rod 15 being connected to one terminal of said link. The connecting rod 18 of the locomotive is pivotally connected to the pin 12 and the opposite end extends forward to the cross-head 19. The cylinder and steam chest are indicated at 20 and 21.

A block is mounted in the link 16 for sliding movement and carries a pin 23 to which one end of the radius rod 24 is connected the other end of the radius rod, in accordance with my invention, is provided with a floating arrangement and this end of the radius rod is formed into an eccentric strap 25. A disk 26 is enclosed within the strap and adapted for rotary movement therein, said disk being provided within a radially extending arm 27. In the present instance the floating lever 28 of the valve crank is pivotally connected as at 29 to the disk 26 at a point eccentric to the center of said disk the other end of the lever 28 being connected in the usual manner by means of a link 30 to an arm 31 which depends from the cross-head and is rigidly connected thereto. Of course it will be obvious that other means than is shown and described in Figure 1, as for instance the plain lever shown in the remaining figures may be substituted for the eccentric strap and disk just so that this means is arranged to vary the amplitude of motion of pivot 29 derived from the oscillations of the arm 27. The valve rod 32 is pivotally connected as at 33 to the floating lever at a point adjacent the point of connection of said lever with the disk 26, it being understood that a block mounts the fulcrum pin 33 and operates in the well known guide as shown. With the exception of the eccentric feature the description thus far has been that of the conventional type of Walschaert gear.

Figure 5:
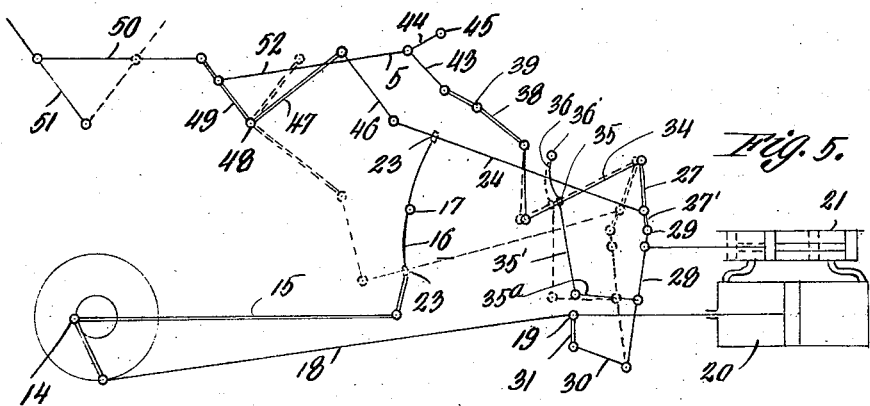
Figure 5 is a view similar to Figure 4 with the crank pin at the lower quarter of the stroke.

It will be obvious that while I have above referred to eccentric 26 the true action of this part is simply equivalent to a lever pivoted at the center of the eccentric disc, and to the end of the radius rod 24, this lever having one very short arm and a longer arm 27. Since this disc 26 is the full equivalent of the arm in operation I have indicated in Figures 2 to 7, this short arm by the numeral 26.

My improvement includes besides this eccentric feature, a second radius rod 34 which is connected at its forward end to the arm 27 of the eccentric disk, extends rearwardly and is connected at a point 35 substantially intermediate the ends of said radius rod to a block which slides in an arcuate link 36. The curvature of the link 36 is struck from a point which is located above the center of oscillation of the disk 26 and is pivotally mounted upon the fixed point 36' upon a stationary portion of the frame. The other end of the link 36 is formed with an arm 35' which is pivotally connected to a link 35$^a$ which is also pivotally connected to an intermediate point on the floating lever 28. The extreme rear end of the radius rod 34 is connected by means of a vertical floating link 37 with a lever 38 which is pivotally connected at 39 at a point intermediate its ends to some stationary part of a locomotive. The opposite end of said lever 38 is pivotally connected at 40 to a toggle which includes a link 43, one end of the link 43 being connected to said lever 38 and the other end to a link 44, said link 44 being connected as at 45 to a stationary point on the locomotive. In full lines in the drawings the links of the toggle are disposed at an angle, and by bringing the links into alinement and again disposing them in angular relation the lever 38 will be oscillated in a more or less vertical path.

The radius rod 24 of the valve gear is pivotally connected by means of a link 46, to arm 47 of a bell crank which is fulcrumed as at 48, the other arm 49 thereof being connected by means of a rearwardly extending rod 50 to the reversing lever 51. The arm 49 of the bell crank is also connected by means of a link 52 to the connected terminals of the links 43 and 44 of the toggle.

It may be mentioned that with the reversing lever 51 in center, the engine running lever 35', which is a continuance of link 36, and lever 28 working full throw, as at all other times, the block 35 will be retained adjacent the top of the link and the lever 34 only moves slightly. Therefore neither arm 27 nor radius rod 24 moves to any great extent. The block 22 will be in the center of link 16 between trunnions 17, thereby assisting to retain the arm 27 in an approximately upright position which causes the bearing 29 and the top end of the floating lever 28 to remain nearly at center position whereby the valve may be given a lead on dead centers.

With the lever in either corner of its sector or quadrant, block 35 would begin in the bottom end of link 36 causing lever 34 to keep the position of the dotted lines which will cause lever 27 and eccentric 26 to vary accordingly and take the position of the dotted lines shown. The fulcrum of lever 28 being between the center and outer edge of eccentric 26 will cause the lever to oscillate from one to the other of the outer points 29, thereby causing lever 28 to take different positions to that held when the lever is in center position.

When the locomotive to which my invention is applied is moved forwardly and the reverse lever 51 is arranged in its extreme positions, it will be appreciated that the block 35 will be disposed in the uppermost portion of the link 36 adjacent the pivot point 36' and consequently when the link is rocked by the movement of the floating lever 28 little or no movement of the radius rod 24 and the second radius rod 34 will take place, thereby permitting the valve gear to operate in the Walschaert fashion.

When the eccentric pin 14 reaches forward dead center, and it is desired to reverse the locomotive, the reverse lever 51 is moved to a position shown in dotted lines in the figures, which movement besides rocking the radius rod 24 in the well known manner, and will cause the pin 29 to move rearwardly of the locomotive through the intermediacy of the attachment, and consequently will move the valve toward the center of its seat. Consequently, as the inertia of the locomotive will cause the drive wheel to rotate forwardly and due to the fact that the block 22 in the box link 16 has been moved to the upper end of the link, the valve will move rearwardly until the steam ports are aligned to admit steam into the cylinder whereby the piston will be driven forwardly to cause rearward rotation of the drive wheel. Should it be desired to then drive the locomotive forward, and the eccentric pin 14 is "off center" the reversing lever 51 is moved to the forward end of the quadrant which action will cause the block 35 to move into the upper end of the box link 36, which action together with the movement of the radius rod 24 will move the arm 27 so that it will practically align with the floating lever 28 which has moved rearwardly, thereby drawing the valve with it, after which the radius rod 24 will continue to move rearwardly and downwardly of the box link 16 and the second radius rod 34 is moved downwardly to the lower end of the box link so as to throw the arm 27 of the eccentric connection forwardly as the point 29 is moved further rearwardly to cause further rearward movement of the valve. Consequently, an exceedingly quick shift of the valve will align the admission ports whereby steam will be admitted to the cylinder to act against the piston for driving the locomotive forwardly.

Assuming that the locomotive is traveling forwardly and the eccentric pin 14 reaches rear dead center and it is desired to drive the locomotive rearwardly, the reversing lever 51 is shifted to the rearwardly of the quadrant which action causes alignment of the toggle links 44 whereby the second radius rod 34 is moved vertically in the boxing 36. Simultaneously with this movement of parts, the radius rod 24 is also caused to move vertically, which action of the two radius rods causes the arm 27 to move to a position approximately perpendicular, thereby shifting the point 29 rearwardly of the locomotive which causes retraction of the valve so that the steam inlet ports adjacent the rear end of the cylinder is half opened by the valve. As the reversing lever is moved further to the rear end of the quadrant, the toggle links are moved rearwardly, thereby causing the second radius rod 34 to move to a position whereby the block 35 is arranged in the lower end of the link. This action of course swings the arm 27 rearwardly of the locomotive whereby the valve is advanced so as to leave a slight opening in the steam inlet port whereby steam is immediately permitted to act upon the piston to drive the locomotive rearwardly. As the locomotive begins to move rearwardly, the steam inlet port opens wider to admit more steam, after which the reversing lever is forced back to an intermediate position at which time the locomotive continues to move rearwardly.

A very important feature of the invention resides in the action obtained by eccentric member 26, and the means for shifting the eccentric member 26.

It will now be noted that a movement of the reversing lever 51 to effect a reversal of the locomotive will also have the effect of varying the distance between the points 22 and 29.

The valve in the steam chest will be shifted slightly by the movement of the floating lever thus induced so as to cause a variation or provide lead for the valve in the reversed position of the valve gear. By this arrangement steam will be admitted to cylinders on dead centers and worked with the valve open for the major portion of the stroke, but as engine reverse lever is pulled towards center steam will be admitted earlier, or before commencement of stroke, according to the set of the valve lead in mid gear.

While I have illustrated and described my invention with some degree of particularity, I realize that in practice various alterations thereover may be made, and I therefore desire to reserve the right and privilege of changing the form of the details of construction, or otherwise altering the arrangement of the correlated parts without departing from the spirit of the invention, or the scope of the appended claims.

Having thus described my invention, what I claim as new and desire to secure by Letters Patent is:—

1. The combination, in a locomotive valve gear of the radial type, of an eccentric crank, an eccentric rod connected thereto, an arcuate link connected to the eccentric rod, a radius rod adjustably held in the link, a floating lever, a valve and valve rod connected to the floating lever, an eccentric connection between the floating lever and radius rod, a reversing lever and means connecting the same to the radius rod, and means operable by movement of said reversing lever for actuating the eccentric whereby to vary the lead of the valve, when the gearing is moved to intermediate positions.

2. The combination in a locomotive valve gear of the radial type, of an eccentric crank, an eccentric rod connected thereto, an arcuate link connected to the eccentric rod, a radius rod adjustably held in the link, a floating lever, a valve and valve rod connected to the floating lever, an eccentric strap formed on the radius rod, a disc revolubly held in the eccentric strap, means connecting the floating lever eccentrically to the disc, a radius arm on said disc, a reversing lever and means connecting the same to the radius link, and means operable by movement of the reversing lever to shift the arm of the disc whereby to vary the amplitude of the oscillations of the disc and its radial arm, and the point of connection of the radius rod to the link whereby to vary the lead of the valve in the intermediate positions of the valve gear.

3. In a locomotive valve gear, the combination with a radius rod, a floating lever, a valve rod having connection with the floating lever, of an oscillating connection between said radius rod and said floating lever, a rocking element, means for connecting the same with the oscillating connection, and a rod connected to the floating lever and to said rocking element for rocking the same.

4. In a locomotive valve gear, the combination with a radius rod, of a floating lever, a valve rod having connection with the floating lever, an oscillating connection between said radius rod and floating lever, a rocking element having a pivotal point, a link connecting the rocking element and one end of the oscillating connection, a second link connecting the floating lever and the rocking element, the first mentioned link having its connection with the rocking element slidable therealong to vary the distance of said connection from the pivotal point of the rocking element, and means to adjust said link along said rocking element.

5. In a locomotive valve gear, the combination with a radius rod, of a floating lever, a valve rod having connection with the floating lever, an oscillating connection between said radius rod and floating lever, a rocking element, a link connecting the rocking element and one end of the oscillating connection, a second link connecting the floating lever and the rocking element, the first mentioned link having its connection with the rocking element slidable therealong to vary the distance of said connection from the pivotal point of the rocking element, means to adjust said link along said rocking element, a rocking link whereto said radius rod is slidably and pivotally connected, and means arranged to vary the position of said slidable and pivotal connection simultaneously with the variation in position of the connection between the first mentioned link and the rocking element.

In testimony whereof I affix my signature in presence of two witnesses.

THOMAS W. ROSE.

Witnesses:
GEO. GRANDCHAUNT,
W. R. HEWLETT.